United States Patent [19]

Gomberg

[11] Patent Number: 4,620,907

[45] Date of Patent: Nov. 4, 1986

[54] LOW TEMPERATURE RADIO-CHEMICAL ENERGY CONVERSION PROCESSES

[75] Inventor: Henry J. Gomberg, Ann Arbor, Mich.

[73] Assignee: Texas Gas Development Corporation, Owensboro, Ky.

[21] Appl. No.: 617,595

[22] Filed: Jun. 5, 1984

[51] Int. Cl.$^4$ .................. B01J 19/08; B01J 19/12
[52] U.S. Cl. .................. 204/157.44; 204/157.4; 204/157.48
[58] Field of Search .................. 204/157.48, 157.1 H, 204/157.4, 157.44

[56] References Cited

U.S. PATENT DOCUMENTS

| 2,754,259 | 7/1956 | Robinson et al. | 204/157.44 |
| 2,787,587 | 4/1957 | Woodard | 204/157.21 |
| 3,073,766 | 1/1963 | Bown et al. | 204/157.44 |
| 3,553,089 | 1/1971 | Mytelka et al. | 204/157.63 |
| 3,826,726 | 7/1974 | Philipp et al. | 204/157.44 |

OTHER PUBLICATIONS

Published Abstract 54540Y/31 E36 of Aug. 13, 1975, of Japanese 097496, dated Feb. 17, 1977; Mitsubishi Heavy Ind.

*Primary Examiner*—Howard S. Williams
*Attorney, Agent, or Firm*—Laurence R. Brown

[57] ABSTRACT

Radiation from fission or fusion nuclear reactors or the like is converted to chemical energy form in a process simplifying handling of the constituent materials and operable at moderate temperatures and pressures with conventional plant construction materials. Thus a chemical in liquid phase is irradiated to form precipitate solid and gaseous constituents. Preferable chemicals are $SnCl_4$ in the process $SnCl_{4(l)} \rightsquigarrow SnCl_{2(s)} + Cl_{2(g)}$ and $TiCl_{4(l)} \rightsquigarrow TiCl_{2(s)} + Cl_{2(g)}$. To obtain titanium metal the following step is used:

$$TiCl_2 \xrightarrow{H} Ti + Cl_2.$$

This latter process also stores enough energy to release hydrogen from water.

9 Claims, 3 Drawing Figures

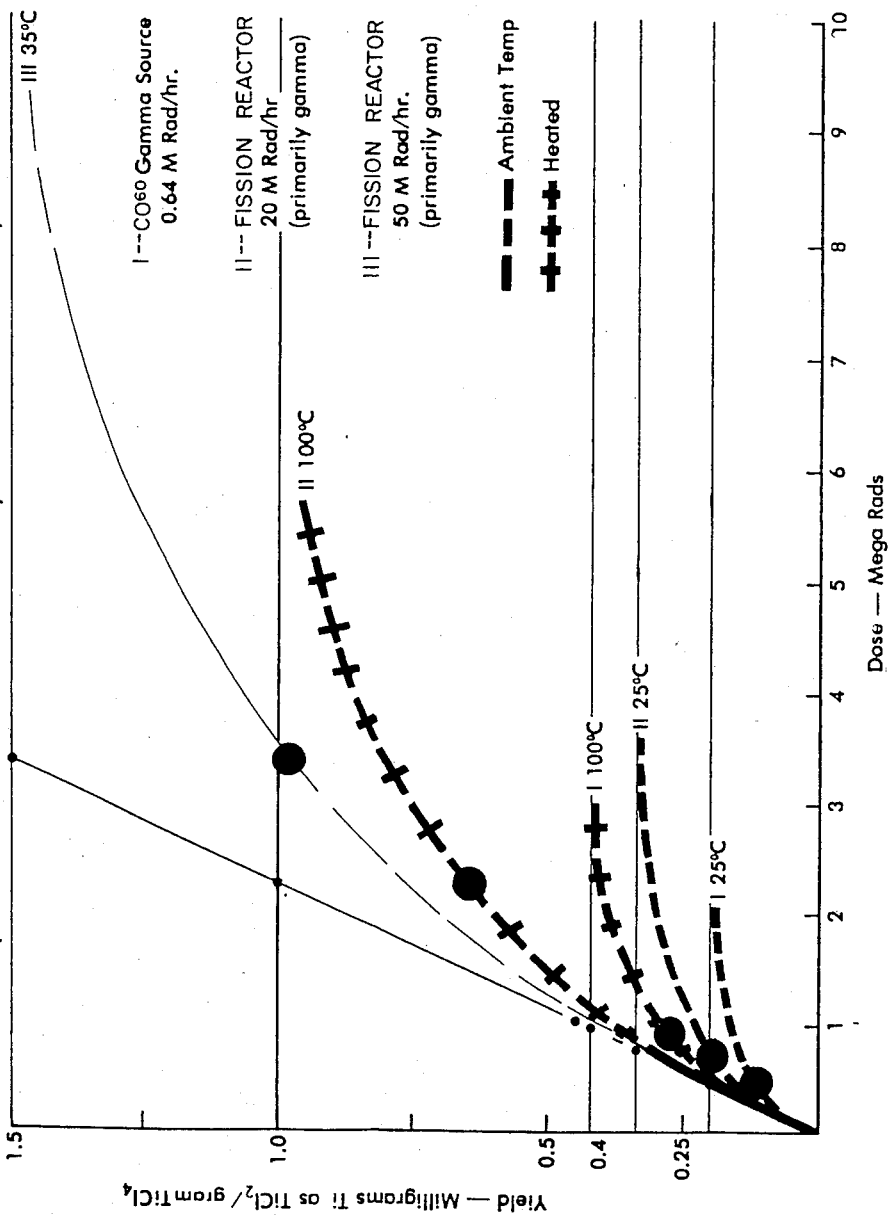

LOW TEMPERATURE RADIO-CHEMICAL ENERGY CONVERSION PROCESSES

TECHNICAL FIELD

This invention relates to the conversion of radiated energy and heat into stored chemical energy and more particularly it relates to radiation of liquids such as tetrachlorides at moderate temperatures to produce gaseous and solid phase constituents having stored chemical energy derived from the radiated energy while permitting ready physical separation of the various chemical products. No additional solvent, or diluent, which may act as a free radical scavenger or source of chemical energy (reducing agent) is used.

BACKGROUND ART

Many chemical processes have been proposed heretofore for use of radiant energy such as available from nuclear reactors to produce high energy chemicals such as $H_2$. Some of the more significant problems of such processes include (a) the necessity to work at high temperatures where accelerated corrosion takes place and conventional materials are ineffective, (b) the necessity to maintain critical ranges of operating conditions of pressure, temperature, and chemical balances to effectuate a desired chemical reaction, (c) the difficulty of separating desired chemical constituents from the residual starting materials and by-products, and (d) the tendency for desired chemical constituents (i.e. $H_2$ and $O_2$) to recombine and thus reduce the effective yields.

Typical of the prior art radio-chemical processes related to this invention using radiant energy to effect chemical reactions are the hereinafter discussed U.S. patents.

W. H. Philipp et al., U.S. Pat. No. 3,826,762—July 30, 1974 proposes a low temperature radiation chemistry method which precipitates specific metals such as nickel, antimony from solutions. Thus, a radiation sensitive salt such as $SbCl_3$ is immersed into an external aqueous or organic developing solution thereby to generate H or OH, etc. reducing components in the presence of radiation. The pure metal (Sb, etc.) is precipitated.

D. E. Bown et al., U.S. Pat. No. 3,073,766—Jan. 15, 1963 proposes a method for preparation of a titanium trichloride as a polymerization catalyst by irradiation of an organic solution (free of water or polarizing compounds) of titanium tetrachloride at temperatures exceeding 500° F. The trichloride precipitates upon radiation and is recoverable from the liquid solution.

A. I. Mytelka et al., U.S. Pat. No. 3,553,089—Jan. 5, 1971 proposes $Co^{60}$ gamma radiation to ionize azo dyestuff waste at ambient temperatures to oxidize organic solutes in the water to decolorize waste water. By addition of a multivalent metal cation ($Fe^{2+}$, $Fe^{3+}$) the efficiency is increased.

R. W. Woodard U.S. Pat. No. 2,787,587—Apr. 2, 1957 proposes use of uranium isotopes of difference valence states (hexavalent and tetravalent) in an isotopic exchange process for enriching uranium. Thus, $UCl_4$, $UO_2Cl_2$ ($U^{+4}$) and $U^{+4}$ is used to produce $UO_2\cdot(U^{+3})$ in an aqueous solution at ambient temperatures in which a precipitate is formed. No radiation is used.

Also, Mitsubishi Heavy Ind. in a published abstract No. 54540Y/31 E36—Aug. 13, 1975 of Japanese No. 097496 dated Feb. 17, 1977 proposes to use $Cl_2$ and $H_2O$ under radiation with a nitrite of alkali metal to produce $H_2$ and $O_2$. In this process ferrous chloride is reacted thermally with cuprous chloride to produce copper and ferric chloride. The objective is to obtain hydrogen as a superior energy component with 2500 K/cal/m³.

These typical prior art chemical processes introduce a range of problems including those above-identified and further problems including the necessity to use diluents or solvents or reducing agents or other sources of chemical energy to supplement radiation and associated heat energy. Also the consumption of the more expensive chemicals used in a reaction can make it too costly for general use. It is also desirable when chemically radiolytically converting chemicals for obtaining stored chemical energy to obtain high enough energy content to permit for example the conversion of water into $H_2$ and $O_2$ constituents. A particular need also of the radiolytic conversion processes is that end products should be derivable without radioactive contamination.

The present invention is directed to processes different from the prior art which resolve the aforestated problems in producing high energy containing chemical constituents in the processing of solutions of multivalent metals by radiant energy. In particular the processes are carried out without solvents at moderate temperatures and afford ready separation of the various product and by-product constituents without tedious or complicated physical or chemical steps and can afford a low cost practical source of enough energy for water conversion. The expensive chemicals are recycled, and the end products are not directly radiated so that they are not radioactively contaminated.

DISCLOSURE OF THE INVENTION

Radiant energy from nuclear reactors or other sources (gamma, X-ray, etc.) effects chemical changes in a multivalent metal chloride solution to store energy in chemical form. Thus, the radiation generates a gas ($Cl_2$) and high energy intermediate precipitate (metal compound) in a process which permits ready physical separation of the constituents. Thus, a liquid phase original solution is radio-chemically converted at low temperatures such as ambient or at temperatures below the boiling point of the liquid by radiation to gaseous and solid precipitate constituents.

The starting liquid metal chlorides are of the group consisting of $TiCl_4$, $SnCl_4$, and $VCl_4$ producing the gaseous constituent $Cl_2$. Also low pressure(s) such as near atmospheric is used in one or the other process. The physical separation simplifies and makes efficient the chemical process, and the moderate temperature and pressure permits a radiation process utilizing radiant nuclear energy from fission or fusion reactions in an environment using conventional materials and techniques with expected long life.

The process therefore converts radiant and heat energy to energy stored in chemical form and is useful to obtain high energy chemical constituents such as $Cl_2$, $H_2$, $O_2$, $SnCl_2$ and $TiCl_2$, $TiCl_3$, $VCl_2$ and also to produce products such as metals in simplified chemical processes carried on at moderate temperatures. The starting metal chlorides may be reformed and recirculated to provide output products. Enough energy is stored in some embodiments to dissociate water into $H_2$ and $O_2$.

The process is particularly adapted to use radiation and heat supplied by fission or fusion nuclear reactors.

Other objectives, advantages and features of the invention will be found throughout the following more detailed description and the claims.

BRIEF DESCRIPTION OF DRAWINGS

In the accompanying drawings:

FIG. 3 is a graph showing effects of radiolysis upon titanium chloride as a function of dose, rate and temperature.

THE PREFERRED EMBODIMENTS

The basic objectives of this invention are to perform chemical and energy transformations by use of radiation and to obtain therefrom energy in chemical form for use on demand. One desired output product is energy. Furthermore, in carrying out the basic premises of the invention, useful chemical constituents are made available. The radiation energy is made available preferably from such sources as cobalt 60 gamma rays, fusion or fission nuclear reactors. Other radiation sources such as X-rays, UV, etc. may also be used.

Other objectives of this invention include the provision of an efficient process for storing energy in chemical form, preferably with high enough energy levels to dissociate water into its constituent parts $H_2$ and $O_2$. A high efficiency process is significantly enhanced by providing simple secondary steps, such as required for separation of different chemicals. This is achieved by providing a basic starting material in liquid form (e.g. metal halides) which has the characteristic of forming a solid state precipitate and a gaseous constituent upon irradiation, thereby to permit easy physical separation of the constituents in their gas, liquid and solid phases to obtain desired output chemicals.

Another important objective of the invention is to provide a process for converting nuclear radiation energy into chemical form at temperatures which may approach ambient and at pressures approaching atmospheric, thereby to permit use of state of the art materials with expected long life in the process, thereby to resolve the problem of having to work inside reactor chambers at very high temperatures.

Figure 2:
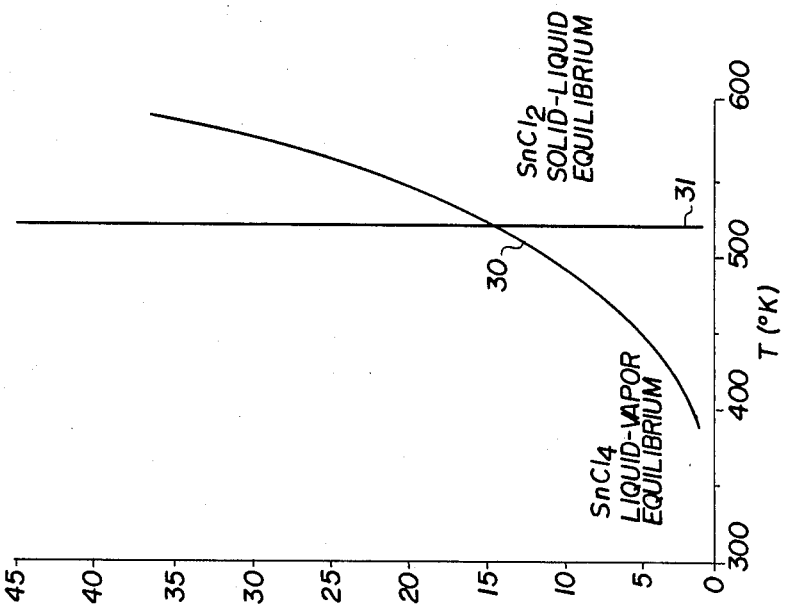
FIG. 2 is a graph illustrating the physical liquid-solid-gas characteristics of the tin compounds of the process in FIG. 1.
Figure 1:
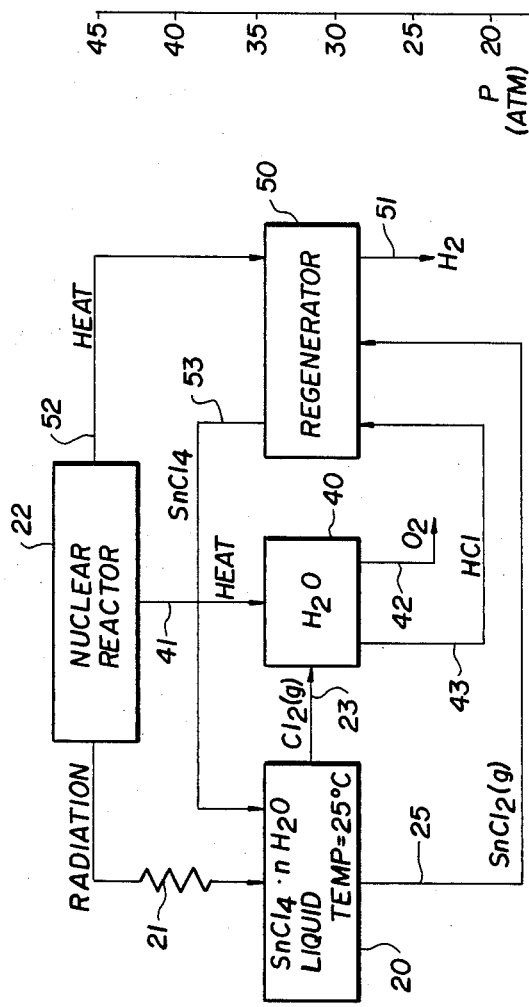
FIG. 1 is a block diagram of a processing system afforded by this invention operable in a cycle in which stannic chloride is irradiated.

These objectives are realized in the preferred embodiment of the invention illustrated in FIGS. 1 and 2, wherein stannic chloride ($SnCl_4$) is the basic chemical processed initially at 25° C. in liquid form in a receptacle 20 by means of irradiation along conveyor 21 from the fission or fusion nuclear reactor 22. As aforesaid the radiation step produces a gaseous constituent $Cl_2$ at conduit 23 and an easily separable solid precipitate $SnCl_2$ at outlet 25, which is a high energy containing product.

As may be seen in the graph of FIG. 2, this process is not critical with regard to temperature or pressure. It may be carried on at ambient temperature and atmospheric pressure although higher yields are obtained at higher temperatures (see graph). The graph has on its abcissa temperature in °K. and on its ordinate pressure in atmospheres. As noted thereon, the liquidvapor equilibrium line plotted for $SnCl_4$ (30) so that as temperature is increased to about 450° K. then the pressure need be increased to about 5 atmospheres to keep the $SnCl_4$ in the liquid phase (above the plotted line 30).

In order to precipitate the $SnCl_2$ as a solid in accordance with the teachings of this invention, the temperature need be below about 525° K. as indicated by the plotted $SnCl_2$ characteristic solid-liquid equilibrium line 31. The other constituent $Cl_2$ is gaseous over the range of temperatures feasible with these constituents.

Note that this basic process has been observed with a $Co^{60}$ gamma source, as well as with a nuclear reactor. The conversion efficiency achieved together with the lack of energy dissipation in separating the (gas-liquid-solid) constituents leads to a process that can provide greater overall efficiency in chemical conversion than is common with nuclear reactors used for conversion of heat to electricity as a required step for electrochemical reactions.

Thus, a basic radio-chemical cycle of improved efficiency is made feasible by this invention for use with nuclear reactors with the additional advantage of $H_2$ output with recirculation of the basic chemicals and the use with known state of the art materials at moderate temperatures and pressures, as follows:

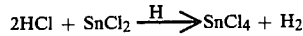

Note that heat alone will not drive the $SnCl_4$ reaction to any appreciable extent.

The second step, known as the reverse Deacon step, would be carried out in chamber 40 deriving heat along channel 41 from reactor 22 and typically requies 1.6 Kcal/mol at 723° K., to produce output oxygen at conduit 42. The HCl is then carried by conduit 43 to the regenerator chamber 50 for initiating the third (regeneration) step by reacting with the $SnCl_2$ derived in the first step.

The regeneration step produces output $H_2$ at conduit 51 and derives heat by means of conduit 52 from the reactor 22. Typically 8.1 Kcal/mol is supplied at 300° K. The resulting $SnCl_4$ is the basic input material which is recirculated to the first step chamber 20 along conduit 53. Thus, $H_2O$ may be broken down into $H_2$ and $O_2$ by this efficient process using less energy than required to convert the reactor energy to electrolyze water.

The reaction is stated in more general form for tetrachlorides in the following cycle, with X being a metal, alkali metal or other similarly behaving ingredient that forms a liquid with Y that breaks up into components A and B with B being a gas:

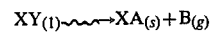

Thus if X is Sn or Ti and Y is $Cl_4$ then XA is $SnCl_2$ or $TiCl_2$ and B is $Cl_2$.

For tetrachlorides this process becomes

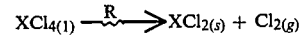

Similarly for liquid carbonyls rather than liquid chlorides X is Fe, CO or Ni, Y is a CO complex $(CO)_5$ or (CO)$_4$ and B is a gas CO or CO$_2$, and the solid precipitate is a metal C, O compound.

A preferred cycle is the Ti cycle hereinafter set forth if an end result product H$_2$ is desired because the energy content level of the solid is sufficient to decompose water and obtain H$_2$ without additional external energy. Other advantages follow.

Irradiation of titanium tetrachloride-heptane solutions to obtain an insoluble precipitate including heptane has been reported in "Energia Nucleare", Vol. 14, No. 4, April 1967 by M. Loffelholz et al., for the purpose of analysis of heptane solutions. These precipitates included TiCl$_3$ in alpha, beta and gamma crystalline form, formed only when heptane is present. Thus, as reported therein the solid TiCl$_2$ is not formed as a precipitate.

The cycle is valid for Ti, Sn, and V, with the aforesaid advantages. It is noted specifically that with a TiCl$_4$ cycle the titanium metal may be produced simply by gentle heating of the TiCl$_2$ produced in the radiation step:

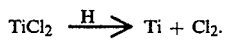

$$TiCl_2 \xrightarrow{H} Ti + Cl_2.$$

Also, the titanium embodiment has the advantage that an alternate more direct cycle without the reverse Deacon step can be used with an attendant power saving by the following cycle:

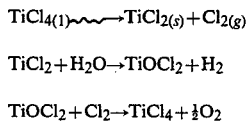

TiCl$_4$(l)⤳→TiCl$_2$(s)+Cl$_2$(g)

TiCl$_2$+H$_2$O→TiOCl$_2$+H$_2$

TiOCl$_2$+Cl$_2$→TiCl$_4$+½O$_2$

Note in all the cycles, the water is not used in the presence of radiation and thus the output H$_2$ and O$_2$ does not become contaminated by radiation, e.g. deuterium, tritium or fission fragments. The Ti and Cl components are all recirculated and contained in the system so that they could become radioactively contaminated without serious effect or restriction on the output products.

EXAMPLE 1

SnCl$_4$ is irradiated with a Co$^{60}$ gamma source at a dose rate of about 0.5 megarad/hour. SnCl$_2$ forms as a white precipitate. Cl$_2$ is present in a proper ratio for SnCl$_2$ (about 2:1).

EXAMPLE 2

Same as Example 1 with SnCl$_4$ in quartz chamber irradiated at an exterior position adjacent a fission nuclear reactor.

EXAMPLE 3

TiCl$_4$ is irradiated to produce TiCl$_2$ as a solid precipitate and Cl$_2$ as a gas by the reaction TiCl$_4$(l)⤳→TiCl$_2$(s)+Cl$_2$(g). This is an unexpected result from the reports in the aforesaid publication. It was found that the process was critical to the presence of free chlorine dissolved in the liquid TiCl$_4$ (the reason for former failure). Thus the liquid TiCl$_4$ was shaken in the presence of Hg or heated Cu powder to eliminate the free chlorine and its poisoning effect on the desired reaction before irradiation. The reaction followed with Cl$_2$ removed into a vacuum as the process continues.

Other examples set forth in connection with the data on the chart of FIG. 3 are now discussed. The chart shows curves for five different titanium cycles using three different dose rates (I, II and III) and two different temperatures (25° and 100° C.). It is assumed that the straight line asymptote limit is the ideal yield line. It is clear from these examples that an increase in dose rate increases the yield of the solid precipitate TiCl$_2$. Also it is clear that the process is temperature sensitive. Thus, although the process can be operated at ambient temperature (25° C.) the yield is increased when operated at a moderate temperature (100° C.) which is not high enough to change the initial liquid phase of the TiCl$_4$ to a gaseous stage and thus interfere with the recovery of Cl$_2$ and intersperse Cl$_2$ with TiCl$_4$ to the effect of poisoning the reaction as hereinbefore mentioned.

Having therefore set forth the invention and its preferred example, those novel features of the invention believed descriptive of its spirit and scope are defined with particularity in the claims.

INDUSTRIAL APPLICATION

Radiation energy from fission or fusion nuclear reactors, or the like, is converted to stored chemical form in a process operable at near ambient temperatures and atmospheric pressures with conventional materials. Thus a radiation sensitive material such as a metal tetrachloride is processed by the radiation. To significantly simplify the process the liquid, solid and gaseous phases of the products are employed. Thus, a metal halide, preferably SnCl$_4$ or TiCl$_4$ is in liquid phase and upon radiation forms easily separable gaseous (Cl$_2$) and solid (SnCl$_2$ or TiCl$_2$) constituents. Such may be further processed to produce H$_2$ and O$_2$ from water at efficiencies greater than those using nuclear reactors for electrolysis of water and to reform the original metal halide for recycling. The process takes place at moderate temperatures and pressures such as ambient and atmospheric thus being useful with conventional materials.

I claim:

1. The radio-chemical method of converting radiated energy into chemical energy form comprising the steps of:
   (a) establishing a starting chemical compound in the liquid phase that chemically reacts endothermically to radiation and heat energy to produce a gaseous and a solid constituent of said compound,
   (b) irradiating said compound in its liquid phase free of solvents to chemically release therefrom in response to the radiation said gaseous and solid constitutents,
   (c) physically separating the solid and gaseous phase constituents from the liquid, and
   (d) chemically processing said constituents to recover therefrom energy stored therein by the irradiation step (b).

2. The method defined in claim 1 including the more restricted step wherein the radiation step (b) is carried out at moderate temperature and atmospheric pressure.

3. The method defined in claim 1 wherein the chemical compound in step (a) consists of one of the chemicals in the group consisting of TiCl$_4$, SnCl$_4$, and VCl$_4$, and the gaseous constituent is Cl$_2$.

4. The method of claim 1 wherein the chemical compound is a reduced valence state energy carrier chosen to exhibit a valence shift with radiation.

5. The method of claim 1 including the step of reacting one of the constituents with a further compound of at least one non-radiated element, to respectively recover the non-radiated element as a low contamination energy source.

6. The method of claim 1 which carried out the following chemical step:

$$TiCl_{4(l)} \rightsquigarrow TiCl_{2(s)} + Cl_{2(g)}$$

7. The method of claim 6 including the step of heating the TiCl$_2$ to produce metallic titanium.

8. The method of claim 6 including the step of removing free chlorine gas (Cl$_2$) from the TiCl$_4$ before the radiation.

9. The radio-chemical method of irradiating a starting chemical compound in its liquid phase free of solvents, namely a tetrachloride compound XCl$_4$ wherein X is one of the group consisting of Ti, Sn, and V to precipitate XCl$_2$.

* * * * *